United States Patent
Stanfield

(10) Patent No.: US 6,682,272 B2
(45) Date of Patent: Jan. 27, 2004

(54) RUBBER CUTTING APPARATUS

(75) Inventor: Charles K. Stanfield, Crete, IL (US)

(73) Assignee: B & J Manufacturing, Glenwood, IL (US)

( * ) Notice: Subject to any disclaimer, the term of this patent is extended or adjusted under 35 U.S.C. 154(b) by 0 days.

(21) Appl. No.: 09/976,752

(22) Filed: Oct. 12, 2001

(65) Prior Publication Data

US 2003/0072623 A1 Apr. 17, 2003

(51) Int. Cl.$^7$ .................. B23D 71/00; B23D 25/07; B26D 1/12
(52) U.S. Cl. .................. 407/29.12; 407/42; 407/31; 83/333
(58) Field of Search .................. 407/29.12, 31, 407/42; 451/2.7, 356, 266, 206, 267, 546, 547; 125/15, 13.01; 30/371; 83/333

(56) References Cited

U.S. PATENT DOCUMENTS

| | | |
|---|---|---|
| 2,703,446 A | 3/1955 | Jensen |
| 2,896,309 A | 7/1959 | Jensen |
| 2,975,504 A | 3/1961 | Bentham |
| 3,074,148 A | 1/1963 | Hemmeter |
| 3,082,506 A | 3/1963 | Jensen |
| 3,102,325 A | 9/1963 | Hemmeter |
| 3,351,997 A | 11/1967 | Neilsen |
| 3,618,187 A | 11/1971 | Jensen |
| 3,680,185 A | 8/1972 | Wood |
| 3,711,909 A | 1/1973 | Commandy et al. |
| 3,742,655 A | 7/1973 | Oliver |
| 3,747,177 A | 7/1973 | Jensen |
| 3,869,795 A * | 3/1975 | Treace .................. 30/388 |
| 3,879,825 A | 4/1975 | Jesen et al. |
| 4,019,234 A | 4/1977 | Jensen et al. |
| 4,021,899 A | 5/1977 | Jensen |
| 4,059,875 A | 11/1977 | Jensen |
| 4,091,516 A | 5/1978 | Jensen et al. |
| 4,263,958 A | 4/1981 | Corless |
| 4,283,819 A | 8/1981 | Willinger |
| 4,283,820 A | 8/1981 | Willinger |
| 4,287,648 A | 9/1981 | Hineborg et al. |
| 4,336,640 A | 6/1982 | Willinger |
| 4,747,194 A | 5/1988 | Wood et al. |
| 4,843,768 A | 7/1989 | Stanfield |
| 5,033,175 A | 7/1991 | Jensen |
| 5,054,177 A | 10/1991 | Jensen |
| 5,075,942 A | 12/1991 | Jensen |
| 5,239,784 A | 8/1993 | Stanfield |
| 5,283,935 A | 2/1994 | Jensen |
| 5,295,332 A | 3/1994 | Tyler et al. |
| 5,461,762 A | 10/1995 | Jensen |
| 5,504,981 A | 4/1996 | Jensen |
| 5,647,698 A | 7/1997 | Jensen |
| 5,660,161 A * | 8/1997 | Chiuminatta et al. .......... 125/15 |
| 6,273,082 B1 | 8/2001 | Tselesin |

* cited by examiner

Primary Examiner—A. L. Wellington
Assistant Examiner—Brian D. Walsh
(74) Attorney, Agent, or Firm—Niro, Scavone, Haller & Niro

(57) ABSTRACT

The present invention is directed to a rotatable abrading wheel assembly useful to finish rubber articles such as tire casings. The assembly has three rotatable wheels, with a central abrading wheel disposed between a pair of lateral support wheels. Each of the three wheels is stamped and formed from sheet metal stock and includes one or more apertures to accommodate an abrading tool drive shaft. The central abrading wheel has a diameter greater than that of the lateral support wheels to thereby provide peripheral abrading portion which is comprised of a series of circumferentially spaced teeth.

7 Claims, 1 Drawing Sheet

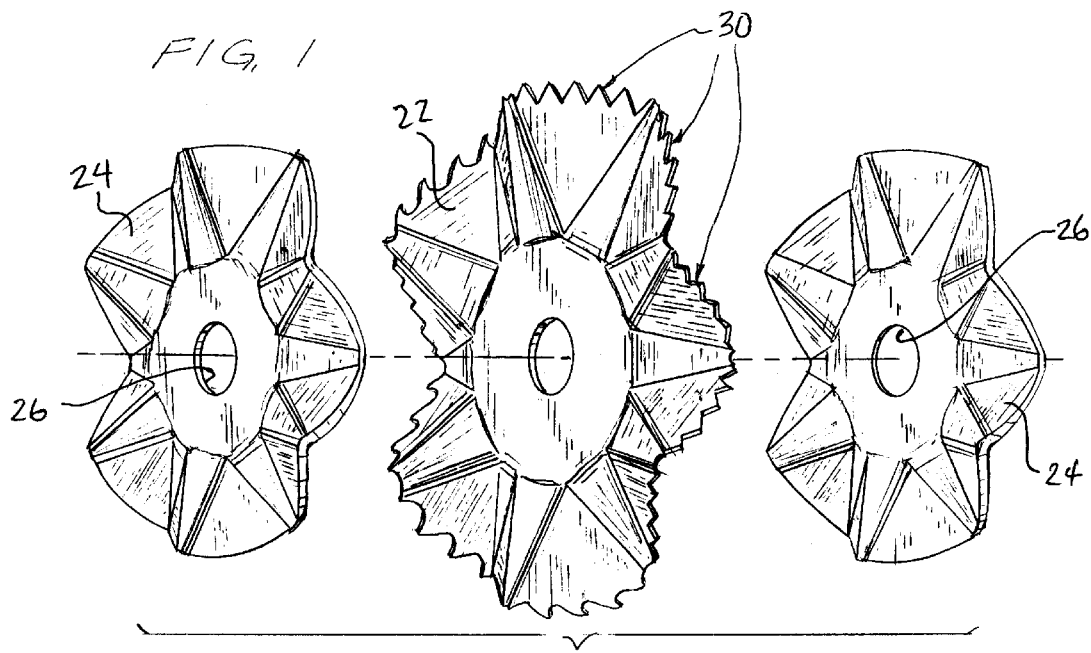
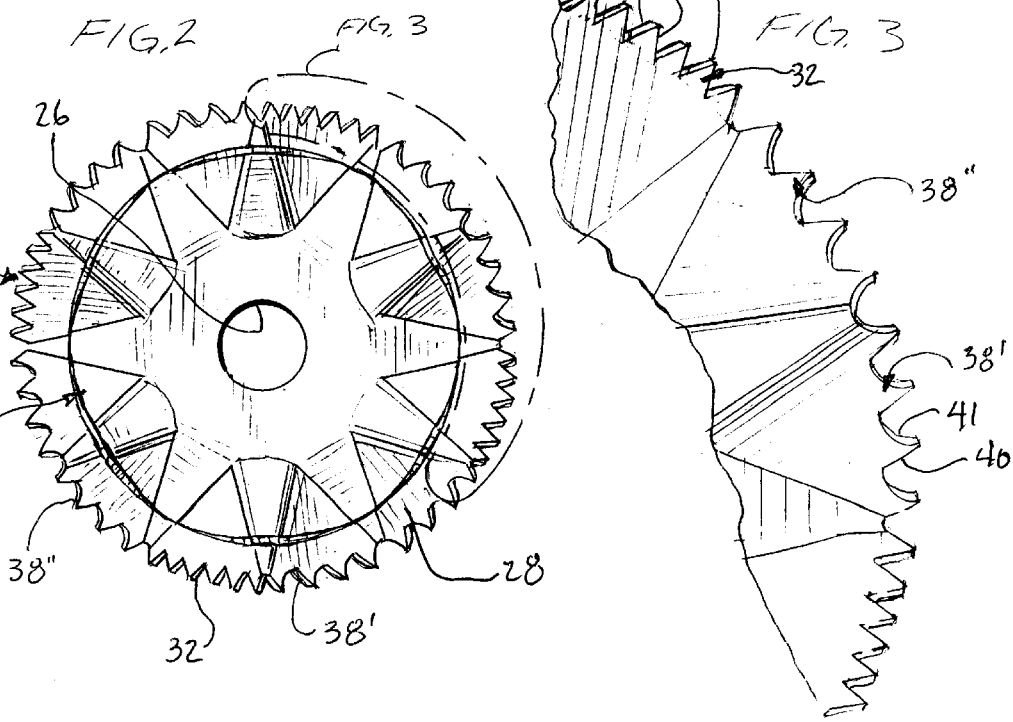

RUBBER CUTTING APPARATUS

BACKGROUND OF THE INVENTION

The present invention relates generally to a rubber cutting or abrading apparatus. More particularly, the invention relates to a rotary tool used to remove rubber from a tire casing in the process of repairing the tire.

A wide variety of tire repair tools are well known in the art. Such prior art tools are disclosed, for example, in U.S. Pat. Nos. 3,742,655; 4,843,768; and 5,239,784. Generally, these prior art devices are constructed from a unitary base element having a grit or abrasive material applied at the periphery.

While several prior art devices have met with considerable success, they nonetheless all suffer from the disadvantage that application of the grit is a time-consuming and costly process that increases the overall cost of the device.

SUMMARY OF THE INVENTION

The present invention is directed to a rotatable cutting or abrading wheel assembly useful to finish rubber articles such as tire casings.

The assembly has three rotatable wheels, with a central abrading wheel disposed between a pair of lateral support wheels. Each of the three wheels is stamped and formed from sheet metal stock and includes one or more apertures to accommodate an abrading tool drive shaft. The central abrading wheel has a diameter greater than that of the lateral support wheels to thereby provide peripheral abrading portion which is comprised of a series of circumferentially spaced teeth.

The cutting wheel assembly made in accordance with the present invention has proven to achieve comparable, if not superior operational performance to that of conventional prior art grit-abrasive wheels. Notably, however, the assembly of the present invention is substantially less expensive to manufacture than are the prior art devices.

BRIEF DESCRIPTION OF THE DRAWINGS

The novel features which are characteristic of the present invention are set forth in the appended claims. The invention itself, however, together with further objects and attendant advantages, will be best understood by reference to the following description taken in connection with the accompanying drawings in which:

FIG. 1 is an exploded perspective view showing the individual wheel components making up the assembly of the present invention;

FIG. 2 is a side view showing a cutting wheel and a support wheel used in one preferred embodiment of the present invention; and FIG. 3 is an enlarged partial view illustrating further details of the cutting wheel shown in FIG. 2.

DETAILED DESCRIPTION OF THE PREFERRED EMBODIMENTS

As illustrated in FIGS. 1–3, the cutting wheel assembly of the present invention is designated generally as 20, and includes a center wheel 22 disposed between two side support wheels 24.

The center wheel 22 is stamped and formed as a one-piece, unitary structure from relatively thin steel sheet stock, for example, 0.028 inch thick medium carbon steel. After stamping and forming, wheel 20 is heat treated to harden the wheel by conventional heat treating processes to approximately 53/54 Rockwell hardness. The support wheels 24 are similarly stamped and formed as unitary, one-piece structures, respectively, typically from a somewhat thicker sheet metal stock, for example, 0.06 inch thickness mild steel. A centrally disposed aperture 26 (or a plurality of apertures) is also formed in each of the three wheels to receive the drive shaft (not shown) of the abrading tool.

Those skilled in the art will appreciate that the cutting wheel assembly of the present invention may be fabricated in many different sizes. By way of example, the cutting wheel 22 may have a diameter of about two inches, while the diameter of the support wheels will be somewhat less, for example, one and five-eighths inches. Thus, a peripheral "cutting" or "abrading" or "working" portion 28 of the center wheel 22 will extend beyond the support wheels 24. This working portion 28 includes a series of circumferentially spaced teeth 30.

In accordance with a preferred embodiment of the invention, these teeth 30 may be constructed of differing shapes. For example, and as most clearly shown in FIG. 3, some teeth 32 may be "straight," which means each tooth extends substantially in a radial orientation with straight edges 34 terminating at a point 36. Other teeth 38 may be "hooked," which means they extend at an angle to the radius of the wheel with, for example, one straight edge 40 and a generally curved edge 41 terminating at an angled point 42. Ideally, the center cutting wheel may have hooked teeth that are angled in opposite directions relative to the radius of the wheel, such as teeth 38' and 38", and also straight teeth 32. This arrangement allows for optimal performance even when the cutting wheel assembly is operated in opposite rotational directions, i.e., "forward" or "reverse." Most preferably, as shown in FIG. 2, the teeth are arranged in sets around the circumference of the wheel 22, with one set comprising a series of hooked teeth 38', and another set comprising a series of hooked teeth 38", each inclined toward the other. These hooked teeth are flanked by sets of straight teeth 32. The straight teeth may also have a circumferential dimension somewhat less than that of the hooked teeth so that the density of straight teeth along the circumference of wheel 22 will be greater than the density of hooked teeth. This arrangement has been found to minimize any pattern that might form on the rubber surface being treated, resulting in a more uniform surface after the abrading process has been performed.

Preferably, each of the three wheels that make up the wheel assembly are also fabricated so that their perimeters form a repeating and continuous wave, with the apex of each wave being displaced axially from the plane of the wheel center by about one-eighth to one-quarter inch. The apex of each wave is displaced to the side of the wheel's plane opposite to that of the adjacent apex. In the 2-inch diameter size abrading wheel assembly shown in FIG. 2, a twelve apex design (six on each side) is preferred, with the axial dimension between adjacent apexes preferably about three-eighths inch, thus each apex is displaced about three-sixteenths inch from the wheel center's plane. The number of apexes employed will depend upon the size of the wheel and the amplitude and the frequency of the wave-form. Between about eight and twenty apexes is the preferred range.

When the center abrading wheel 22 is formed in this manner, the portion of the wheel's circumference between adjacent apexes may be termed a "segment" of the wheel. Preferably, the sets of teeth mentioned above will be grouped, as shown in FIG. 2, such that one set of hooked teeth 38' will occupy one segment, followed by a set of hooked teeth 38" on the next segment, and finally a set of straight teeth 32 on the next segment. This pattern is then repeated around the entire circumference of the wheel 22. Alternatively, it is also possible to have differently sized and/or shaped teeth positioned along a given segment.

When the wave-form embodiment is employed, it is of course necessary that each of the support wheels 24 conform in shape to the form of the abrading wheel 22.

In some cases, it may be desirable to enhance the cutting capability of the disclosed embodiment by simply adding a second cutting wheel and a third support wheel. Even further additional cutting wheels are contemplated by the present invention.

It will be appreciated by those skilled in the art that various modifications and changes can be made to the illustrated embodiments without departing from the spirit of the present invention. All such modifications and changes are intended to be covered by the appended claims.

I claim:

1. A rotatable cutting wheel assembly useful to finish the surface of rubber articles comprising:

a cutting wheel disposed between a pair of support wheels, each of said wheels being stamped and formed from sheet metal stock;

the cutting wheel having a diameter greater than that of the support wheels to thereby provide a peripheral cutting portion comprised of a series of circumferentially spaced teeth; each of said support wheels having a form which conforms to the shape of the cutting wheel and being placed substantially contiguous to the cutting wheel;

each of said wheels also having one or more apertures to accommodate a wheel drive shaft;

the cutting wheel having a wave-form circumference thereby defining a plurality of wave apexes, each apex being axially displaced from the plane of the wheel and on a side of the plane opposite to that of adjacent apexes.

2. The cutting wheel assembly of claim 1 wherein the center cutting wheel is heat treated to harden the sheet metal stock.

3. The cutting wheel assembly of claim 1 wherein at least some of the teeth are straight teeth and other of the teeth are hooked teeth.

4. The cutting wheel assembly of claim 3 wherein the straight teeth are grouped into sets which are located on at least some of the segments of the cutting wheel circumference and the hooked teeth are grouped into sets which are located on other of the segments of the cutting wheel circumference.

5. The cutting wheel assembly of claim 3 wherein at least some of the teeth are hooked teeth that are inclined in one direction relative to the radius of the cutting wheel and other of the teeth are hooked teeth that are inclined in the other direction relative to the radius of the cutting wheel.

6. The cutting wheel assembly of claim 5 wherein still other of the teeth are straight teeth.

7. The cutting wheel assembly of claim 1 wherein one or more additional cutting wheels are employed, each disposed between a pair of support wheels.

* * * * *